(12) United States Patent
Gao (10) Patent No.: US 12,468,438 B2
(45) Date of Patent: Nov. 11, 2025

(54) ELECTRONIC DEVICE INPUT METHOD AND ELECTRONIC DEVICE

(71) Applicant: Lenovo (Beijing) Limited, Beijing (CN)

(72) Inventor: Ying Gao, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 18/604,170

(22) Filed: Mar. 13, 2024

(65) Prior Publication Data

US 2024/0329824 A1 Oct. 3, 2024

(30) Foreign Application Priority Data

Mar. 27, 2023 (CN) .......................... 202310317219.3

(51) Int. Cl.
*G06F 3/0487* (2013.01)
*G06F 3/0484* (2022.01)

(52) U.S. Cl.
CPC .......... *G06F 3/0487* (2013.01); *G06F 3/0484* (2013.01)

(58) Field of Classification Search
CPC .............................. G06F 3/0487; G06F 3/0484
See application file for complete search history.

(56) References Cited

U.S. PATENT DOCUMENTS

| | | | | |
|---|---|---|---|---|
| 10,656,719 B2* | 5/2020 | Degner | ................. | G06F 3/0445 |
| 11,221,749 B2* | 1/2022 | Wallace | ................. | G06F 1/1616 |
| 12,001,628 B2* | 6/2024 | Cheng | ................. | G06F 1/1684 |
| 2009/0303022 A1* | 12/2009 | Griffin | ................. | G06F 3/016 |
| | | | | 340/407.2 |
| 2010/0164904 A1* | 7/2010 | Kim | ................. | G06F 3/038 |
| | | | | 345/174 |
| 2014/0043289 A1* | 2/2014 | Stern | ................. | G06F 3/0446 |
| | | | | 345/174 |
| 2014/0267951 A1* | 9/2014 | Lee | ................. | G06F 3/046 |
| | | | | 29/829 |
| 2016/0103496 A1* | 4/2016 | Degner | ................. | G06F 1/169 |
| | | | | 345/157 |
| 2017/0344215 A1* | 11/2017 | Zhang | ................. | G06F 1/169 |
| 2018/0120985 A1* | 5/2018 | Wallace | ................. | G06F 1/169 |
| 2018/0218859 A1* | 8/2018 | Ligtenberg | ................. | H03K 17/9622 |
| 2019/0018506 A1* | 1/2019 | Bernstein | ................. | G06F 3/0482 |
| 2019/0294828 A1* | 9/2019 | Yoshizawa | ................. | G06F 21/83 |
| 2020/0183580 A1* | 6/2020 | Bertrand | ................. | G06F 3/04845 |

(Continued)

FOREIGN PATENT DOCUMENTS

| | | | | |
|---|---|---|---|---|
| CN | 102801851 A | * | 11/2012 | ............. G06F 21/53 |
| CN | 102819374 A | * | 12/2012 | ........... G06F 3/0416 |

(Continued)

*Primary Examiner* — Ricardo Osorio
(74) *Attorney, Agent, or Firm* — ANOVA LAW GROUP, PLLC (57) ABSTRACT

The present disclosure provides an electronic device input method and an electronic device. The method includes receiving a first type of input signal in an input area of the electronic device, and determining a first input area and a second input area based on the input area according to the first type of input signal. The first input area is used to receive a first type of input signal, and the second input area is used to receive a second type of input signal. The first type of input signal is different from the second type of input signal.

20 Claims, 4 Drawing Sheets

(56) References Cited

U.S. PATENT DOCUMENTS

| | | | |
|---|---|---|---|
| 2024/0004526 A1* | 1/2024 | Chen | G06F 40/166 |
| 2024/0310948 A1* | 9/2024 | Bok | G06F 3/0446 |

FOREIGN PATENT DOCUMENTS

| | | | | |
|---|---|---|---|---|
| CN | 105955641 B | * | 7/2019 | G06F 3/016 |
| CN | 113892076 A | * | 1/2022 | G06F 1/1616 |
| DE | 102012108826 A1 | * | 3/2013 | G06F 21/83 |
| KR | 20240001637 A | * | 1/2024 | |
| WO | WO-2015012789 A1 | * | 1/2015 | G06F 3/03547 |
| WO | WO-2016068394 A1 | * | 6/2016 | G06F 1/1652 |
| WO | WO-2019200915 A1 | * | 10/2019 | G06F 3/0418 |
| WO | WO-2022039713 A1 | * | 2/2022 | |
| WO | WO-2023163537 A1 | * | 8/2023 | |

\* cited by examiner

ELECTRONIC DEVICE INPUT METHOD AND ELECTRONIC DEVICE

CROSS-REFERENCE TO RELATED APPLICATION

This application claims priority to Chinese Patent Application No. 202310317219.3, filed on Mar. 27, 2023, the content of which is incorporated herein by reference in its entirety.

TECHNICAL FIELD

This application generally relates to the field of computer technology and, more particularly, to an electronic device input method and electronic device.

BACKGROUND

With the development of technology, the input methods of electronic devices are becoming more and more diverse, and different input methods have different functions or advantages. Electronic devices may be connected to external input devices to expand different input methods, but they are inconvenient to carry and use. When there are multiple input methods on an electronic device, due to space limitations, the input areas of different input methods need to overlap, and the signals of different input methods are different. When the entire input area detects different input signals at the same time, it cannot respond in time and operate synchronously, and the user Poor experience.

SUMMARY

In accordance with the present disclosure, there is provided an electronic device input method. The method includes receiving a first type of input signal at an input area of an electronic device, and determining a first input area and a second input area based on the input area according to the first type of input signal. The first input area is used to receive the first type of input signal and the second input area is used to receive a second type of input signal. The first type of input signal is different from the second type of input signal.

In accordance with the present disclosure, there is also provided an electronic device input system. The system includes a processor and a memory coupled to the processor, the memory storing instructions that, when executed by the processor, cause the processor to receive a first type of input signal at an input area of an electronic device, and determine a first input area and a second input area based on the input area according to the first type of input signal. The first input area is used to receive the first type of input signal and the second input area is used to receive a second type of input signal. The first type of input signal is different from the second type of input signal.

Also in accordance with the present disclosure, there is provided an electronic device. The device includes an input area and a controller. The input area includes a first sensing layer and a second sensing layer arranged overlappingly, where the first sensing layer is used to receive a first type of input signal and the second sensing layer is used to receive a second type of input signal. The controller is configured to, if the first sensing layer receives the first type of input signal, determine a first effective sensing area and a second effective sensing area based on the input area. The second effective sensing area is an area that the second sensing layer is able to receive the second type of input signal, the first effective sensing area is an area where the first sensing layer is able to receive the first type of input signal, and the first effective sensing area and the second effective sensing area respectively correspond to the first input area and the second input area included in the input area.

BRIEF DESCRIPTION OF THE DRAWINGS

The above and other objects, features and advantages of exemplary embodiments of the present disclosure will become readily understood by reading the following detailed description with reference to the accompanying drawings. In the accompanying drawings, several embodiments of the present disclosure are shown by way of example and not by way of limitation. In the drawings, the same or like reference numerals represent the same or like parts.

DETAILED DESCRIPTION

In order to make the purpose, features, and advantages of the present disclosure more obvious and understandable, the technical solutions in the embodiments of the present disclosure will be clearly and thoroughly described hereinafter in conjunction with the accompanying drawings in the embodiments of the present disclosure. Apparently, the described embodiments are merely partial but not all of the embodiments of the present disclosure. Based on the embodiments in this disclosure, all other embodiments obtained by those skilled in the art without making creative efforts fall within the scope of protection of this disclosure.

Figure 1:
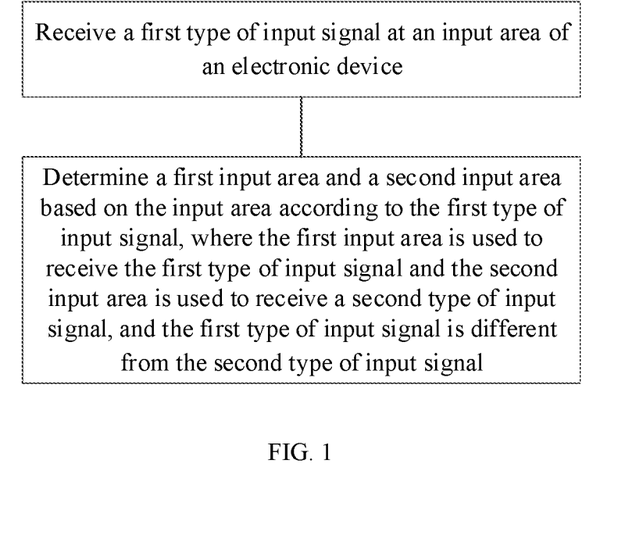
FIG. 1 shows a flowchart of implementing an electronic device input method, according to an embodiment of the present disclosure.
Figure 2:
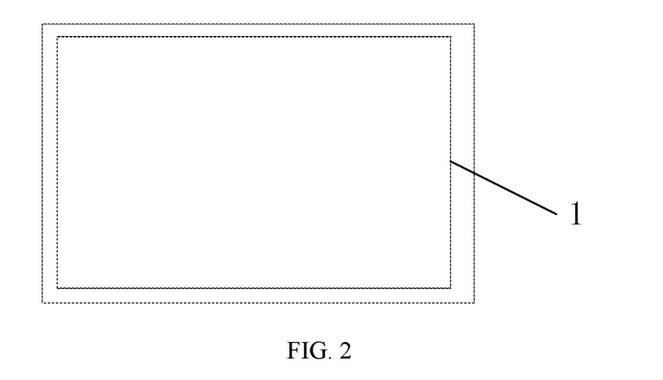
FIG. 2 shows a schematic structural diagram of an electronic device, according to an embodiment of the present disclosure.

Referring to FIG. 1, an embodiment of the present disclosure provides an electronic device input method. Referring to FIG. 2, the electronic device includes an input area 1. The method includes: receiving a first type of input signal at the input area 1 of the electronic device.

Figure 3:
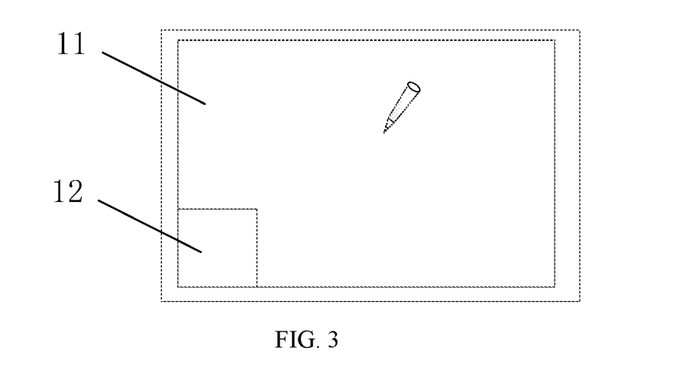
FIG. 3 shows another schematic structural diagram of an electronic device, according to an embodiment of the present disclosure.

Referring to FIG. 3, according to the first type of input signal, the first input area 11 and the second input area 12 are determined based on the input area 1, where the first input area 11 is used to receive the first type of input signal, and the second input area 12 is used to receive a second type of input signal. The first type of input signal is different from the second type of input signal.

In the electronic device input method in the embodiments of the present disclosure, according to the first type of input signal received by the input area 1 of the electronic device, the first input area 11 and the second input area 12 are determined based on the input area 1. The first input area 11 and the second input area 12 are used to receive different types of input signals, so that the electronic device can quickly respond to different types of input signals received by the input area 1 and realize synchronous operation of the input signals to improve user experience.

In one embodiment, the input area 1 of the electronic device may receive different types of input signals, including a first type of input signal and a second type of input signal. For example, the first type of input signal may be an electromagnetic signal generated by an electromagnetic pen, and the second type of input signal may be a non-electromagnetic touch signal generated by a finger or a common stylus pen touching the input area 1. The second type of input signal may specifically include a resistive touch signal, a capacitive touch signal, and a wave touch signal. The wave touch signal includes an acoustic wave touch signal and an infrared touch signal.

Figure 4:
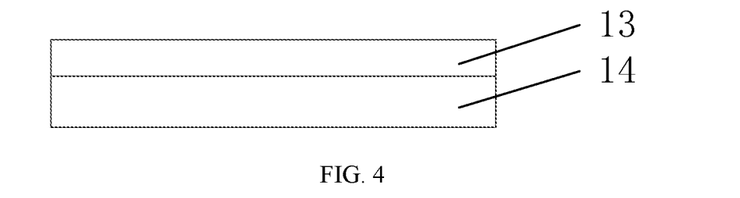
FIG. 4 shows another schematic structural diagram of an electronic device, according to an embodiment of the present disclosure.

In one embodiment, referring to FIG. 4, the input area 1 of the electronic device may include a first sensing layer 14 and a second sensing layer 13 overlappingly arranged. The first sensing layer 14 and the second sensing layer 13 are used to receive the first type of input signal and the second type of input signal respectively.

In one embodiment, before receiving the first type of input signal, the entire input area 1 may be capable of receiving the first type of input signal and the second type of input signal. For example, by performing a touch operation at any position of the input area 1 manually or using an ordinary stylus pen, the input area 1 may receive the second type of input signal generated by the touch operation. A user may perform touch operations on the entire input area 1. Alternatively, by operating a capacitive pen at any position of the input area 1, the input area 1 may receive the first type of input signal generated by the operation of the capacitive pen. Based on the received first type of input signal, the first input area 11 and the second input area 11 are determined based on the input area 1. The first input area 11 and the second input area 12 are configured to receive the first type of input signal and the second type of input signal respectively, so that the electronic device may respond quickly and operate synchronously. For example, when an electromagnetic pen performs a painting operation, the electronic device may quickly respond to the electromagnetic signal and may simultaneously display the trajectory of the painting operation.

In one embodiment, the first input area 11 does not receive the second type of input signal, and the second input area 12 does not receive the first type of input signal to avoid the same operation generating different types of input signals, causing interference and affecting the response speed. For example, when operating the electromagnetic pen in the first input area 11, only the first sensing layer 14 generates the first type of input signal, and the second sensing layer 13 does not generate the second type of input signal. The two input areas 12 are areas that do not overlap with each other. Apparently, the first input area 11 may also partially overlap with the second input area 12 in some embodiments. The overlapping area may receive the first type of input signal and the second type of input signal. When the first type of input signal is received in the overlapping area, the first input area 11 and the second input area 12 may be redetermined so that the area where an operating entity operates in the input area 1 may only receive the first type of input signal.

In one embodiment, the second input area 12 may adjust the area size and/or area position of the second input area 12 based on the input of the second type of input signal. For example, an area size adjustment operation may be performed in the second input area 12, and in response to the operation, the area size of the second input area 12 is correspondingly expanded or reduced. The operation of adjusting the area size may be a two-finger operation. Use two fingers or other appropriate operating entities to form two touch points on the second input area 12. In response to the two touch points approaching each other, the second input area 12 is reduced, and in response to the two touch points moving away from each other, the area size of the second input area 12 is expanded. Perform a drag operation on the second input area 12 and adjust the second input area 12 to the end position of the drag operation, thereby adjusting the regional position of the second input area 12. For example, use a finger or an operating entity such as an ordinary stylus to touch the border of the second input area 12 and perform a drag operation to adjust the area position of the second input area 12 to a designated area.

The area size or area position of the first input area 11 may be adjusted based on the adjustment of the area size or area position of the second input area 12. For example, when the second input area 12 is adjusted from the left side of the input area 1 to the right side, correspondingly, the first input area 11 is adjusted from the area outside the first input area 11 on the right side of the input area 1 to the area outside the first input area 11 on the left side of the input area 1.

In one embodiment, the area size and/or area position of the first input area 11 is adjusted based on the input of the first type of input signal. For example, an area size adjustment operation is performed in the first input area 11, and in response to the operation, the area size of the first input area 11 is correspondingly expanded or reduced. The operation of adjusting the area size may include calling up the menu of the first input area 11, and adjusting the area size and area position of the first input area 11 through the menu. Apparently, a user may also perform a drag operation on the first input area 11 to adjust the first input area 11 to the end position of the drag operation, thereby adjusting the regional position of the first input area 11. For example, use an electromagnetic pen to touch the border of the first input area 11 and perform a drag operation to adjust the area position of the first input area 11 to a specified area.

Figure 5:
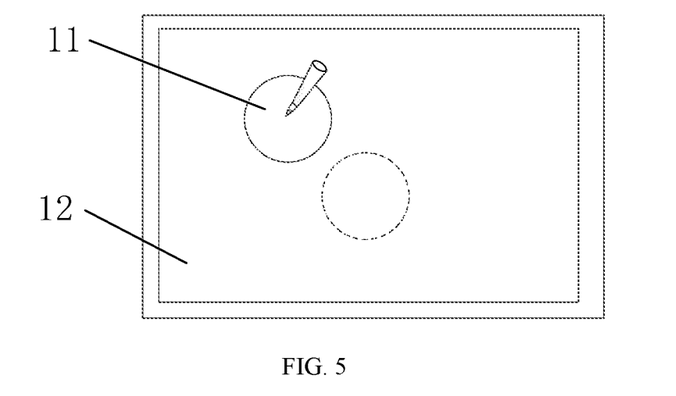
FIG. 5 shows another schematic structural diagram of an electronic device, according to an embodiment of the present disclosure.

Alternatively, the area position of the first input area 11 may be adjusted as the input position of the first type of input signal changes. As shown in FIG. 5, when the input position of the first type of input signal moves from the center of the dotted circle in the figure to the center of the solid circle, the first input area 11 is adjusted from the position of the dotted circle to the position of the solid circle.

In one embodiment, referring to FIG. 5, the input area 1 has a display function. The first input area 11 and the second input area 12 may be distinguished by different display effects. Specifically, the input area 1 may distinguish the first input area 11 and the second input area 12 through different display effects such as display boxes or different background colors. A user may perform corresponding operations in the first input area 11 and the second input area 12 to input corresponding types of input signals.

In the embodiments of the present disclosure, the display function of the input area 1 may be turned on or off.

In one embodiment, the second input area 12 displays shortcut keys, and the electronic device is controlled by operating the shortcut keys. For example, the second input area 12 displays a zoom function key. By operating the zoom function key, the content displayed on the electronic device may be zoomed.

Figure 6:
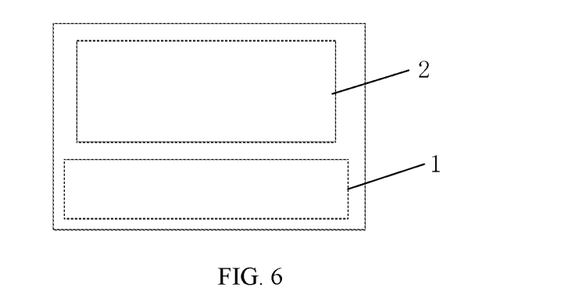
FIG. 6 shows another schematic structural diagram of an electronic device, according to an embodiment of the present disclosure.

Referring to FIG. 6, in the embodiments of the present disclosure, the electronic device may further include a keyboard. The electronic device may be a laptop computer. The laptop computer includes a control terminal and a display terminal connected to the control terminal. The input area 1 is located on the control terminal. The touch operation in the second input area 12 may control the display content on the display end. When the input area 1 has a display function, the touch operation on the second input area 12 may also control the display content of the first input area 11. Controlling the display content of the display end and the first input area 11 includes but is not limited to zooming, page scrolling, screenshots, copying, etc.

In one embodiment, the first input area 11 has display content, and based on the input of the second type of input signal in the second input area 12, the display of the display content of the first input area 11 may be controlled. For example, when using an electromagnetic pen to draw in the first input area 11, the first input area 11 may simultaneously display the drawing content. By performing a touch operation on the second input area 12, the display content of the first input area 11 may be controlled according to the generated the second type of input signal. Specifically, the display content of the first input area 11 may be enlarged, reduced, parallelly moved, etc.

In one embodiment, the electronic device has a display screen, and input in the first input area 11 and/or the second input area 12 controls changes in the display content of the display screen. When the electronic device is a laptop computer, the display screen may be the screen of the display terminal of the laptop computer. For example, the display screen may synchronously display the painting content in the first input area 11. With the input in the second input area 12, the display content on the display screen changes accordingly. The input to the second input area 12 may be based on a touch operation in the second input area 12, and the input to the second input area 12 may be to control zoom, parallel move, etc. of the display content of the display screen.

In one embodiment, determining the first input area 11 and the second input area 12 includes: determining the size of the second input area 12 according to the first type of input signal, and determining the size of the first input area 11 according to the input area 1. The first input area 11 and the second input area 12 are determined based on the input area 1. Determining the first input area 11 and the second input area 12 may be to first determine the size of the second input area 12, and then determine the size of the first input area 11 based on the input area 1. For example, after determining the size of the second input area 12, the remaining area of the input area 1 is determined to be the first input area 11.

In one embodiment, determining the first input area 11 and the second input area 12 includes: determining the size of the first input area 11 according to the first type of input signal, and determining the size of the second input area 12 according to the input area 1. In the embodiments of the present disclosure, the size of the first input area 11 may also be determined first, and then the size of the second input area 12 is determined based on the input area 1. For example, after determining the size of the first input area 11, the remaining area of the input area 1 is determined to be the second input area 12.

In one embodiment, determining the first input area 11 and the second input area 12 includes: determining the position of the second input area 12 according to the first type of input signal, and determining the position of the first input area 11 according to the input area 1. For example, upon receiving a first type of input signal, a preset area of the input area 1 may be determined as the second input area 12, and areas other than the second input area 12 in the input area 1 may be determined as the first input area 11. In one embodiment, the preset area is a certain range on the left side of input area 1.

There may also be multiple preset areas. When a first type of input signal is received, the second input area 12 is determined according to the priority order of the multiple preset areas. The preset areas may include a first preset area and a second preset area. The first preset area is a certain range on the left side of the input area 1, and the second preset area is a certain range on the right side of the input area 1. The first preset area has a higher priority than the second preset area. When a first type of input signal is received, the first preset area is determined to be the second input area 12. If the position of the first type of input signal is located within the range of the first preset area, the second preset area is determined to be the second input area 12.

Figure 7:
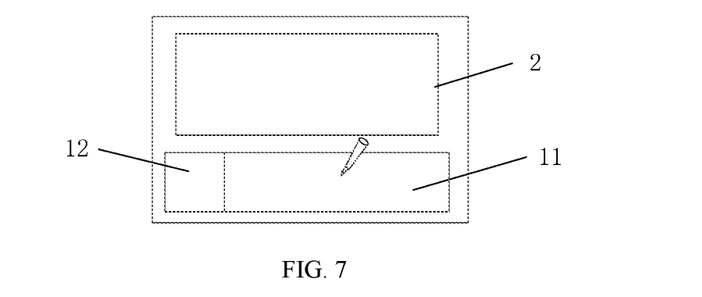
FIG. 7 shows another schematic structural diagram of an electronic device, according to an embodiment of the present disclosure.

In one embodiment, referring to FIG. 7, the first input area 11 and the second input area 12 have different display effects, and the different display effects may be used to distinguish the first input area 11 and the second input area 12 for users. The input area 1 has a display function. When the first input area 11 and the second input area 12 are determined based on the input area 1, the two input areas are distinguished by the display function of the input area 1. Specifically, by displaying different background colors and the like, the first input area 11 and the second input area 12 have different display effects. Alternatively, the first input area 11 and the second input area 12 have different display effects through display frames to distinguish the first input area 11 and the second input area 12.

In one embodiment, determining the first input area 11 and the second input area 12 based on the input area 1 according to the first type of input signal includes: determining the position of the first type of input signal; based on the input area 1, determining the area outside the first input area 11 to be the second input area 12, where the first input area 11 is determined based on the position of the first type of input signal. When using an electromagnetic pen, the first type of input signal is an electromagnetic signal. When the distance between the electromagnetic pen and the input area 1 is reduced to a certain range or the electromagnetic pen is in contact with the input area 1, the input area 1 may receive the electromagnetic signal emitted by the electromagnetic pen. At this point, the position where the electromagnetic signal is received may be determined, and the first input area 11 is determined so that the position where the electromagnetic signal is received is within the range of the first input area 11. When the electromagnetic pen is operated in the first input area 11, other types of input signal will not be generated. The electronic device may quickly respond to received electromagnetic signals and operate synchronously.

The first input area 11 is determined by using the position of the first type of input signal as the base point, and may be a certain range centered on the position of the first type of input signal as the first input area 11. A certain range centered on the position of the first type of input signal may be a circular area, a rectangular area, or any other shaped area.

Figure 8:
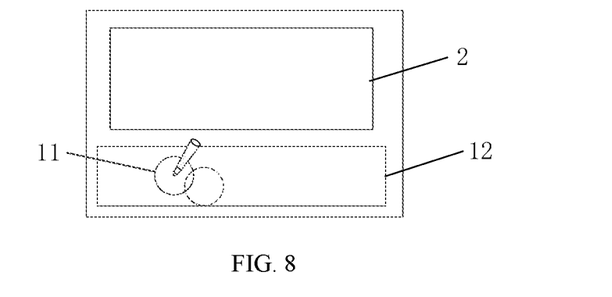
FIG. 8 shows another schematic structural diagram of an electronic device, according to an embodiment of the present disclosure.

In one embodiment, referring to FIG. 8, in response to the position change of the first type of input signal, it is determined that the position of the first input area 11 changes accordingly. When the first input area 11 has a certain range with the position of the first type input signal as the base point, the position of the first input area 11 is dynamically adjusted as the position of the first type input signal changes. For example, when an electromagnetic pen is operated at a first position of the input area 1, the position of the first type of input signal is the first position, and the first input area 11 is a center area with the first position as the center and r as the radius. When the electromagnetic pen moves to a second position, the position of the first type input signal is the second position, and the first input area 11 is adjusted to a center area with the second position as the center and r as the radius. As shown in FIG. 8, the position of the first type input signal moves from the center of the dotted circle to the center of the solid circle, and the position of the first input area 11 changes from the area indicated by the dotted circle to the area indicated by the solid circle.

In one embodiment, determining the position of the first type of input signal includes: detecting that a relative positional relationship between the operating entity and the input area 1 satisfies a hovering condition. The hovering condition may be that the vertical distance between the operating entity such as an electromagnetic pen and the input area 1 is within a preset distance range. When a user operates in the input area 1, the operating entity gradually approaches the input area 1 until it touches the input area 1. When the operating entity approaches the input area 1 to the preset distance, the first type of input signal of the operating entity is used. The first input area 11 and the second input area 12 are determined based on the input area 1, so that the electronic device may quickly respond to the first type of input signal and operate synchronously. The hovering condition may be that the vertical distance between the operating entity such as the electromagnetic pen and the input area 1 is reduced to a preset distance range, and the time period of the electromagnetic pen within the preset distance range reaches a preset time length. The preset distance may be determined based on operating habits, signal strength, etc. The spatial position of the operating entity is obtained, and the position of the first type of input signal in the input area 1 is determined based on the spatial position of the operating entity. The position of the first type of input signal in the input area 1 may be determined based on the spatial position of the operating entity, and the first input area 11 is determined based on the position of the first type of input signal, allowing the user to operate in the first input area 11, thereby enabling the electronic device to quickly respond to the first type of input signal.

In one embodiment, referring to FIG. 8, the operating entity moves spatially relative to the input area 1, the spatial position of the operating entity is reacquired. Based on the reacquired spatial position of the operating entity, the position of the first type of input signal in the input area 1 is determined. When the operating entity moves spatially relative to the input area 1, the position range of the first input area 11 is adjusted accordingly. As the spatial position of the operating entity changes, the position of the determined first type input signal in the input area 1 changes accordingly. By dynamically adjusting the position of the first input area 11, requirements of users for operating in different positions are met. The position of the first type input signal in the input area 1 determined based on the acquired spatial position of the operating entity may be stored for comparison with the redetermined position to determine whether the operating entity has spatially moved relative to the input area 1. After the position range of the first input area 11 is adjusted accordingly, the original stored position may be updated by using the redetermined position of the first type input signal in the input area 1. As shown in FIG. 8, the operating entity moves relative to the input area 1 by moving from the center of the dotted circle to the center of the solid circle, and the first input area 11 changes from the area indicated by the dotted circle to the area indicated by the solid circle.

In one embodiment, the position range of the first input area 11 may be determined directly based on the redetermined position of the first type input signal in the input area 1, without determining whether the spatial position of the operating entity changes.

In the embodiments of the present disclosure, when the operating entity satisfies the hovering condition again, the spatial position of the operating entity may be reacquired to dynamically adjust the position of the first input area 11. It is also possible to reacquire the spatial position of the operating entity according to a preset time interval to dynamically adjust the position of the first input area 11. The preset time interval may be 500 ms, 1s, etc. For example, the spatial position of the operating entity is reacquired every 500 ms, and the position of the first type of input signal in the input area 1 is determined based on the reacquired spatial position of the operating entity. When the operating entity moves spatially relative to the input area 1, the position range of the first input area 11 is adjusted accordingly. It may be also possible that when the contact position between the operating entity and the input area 1 changes, the position of the determined first type of input signal in the input area 1 changes accordingly, and the position of the first input area 11 is dynamically adjusted, to meet the requirements of users for operating in different positions.

In the embodiments of the present disclosure, the first type of input signal includes a floating signal and a contact signal.

In one embodiment, referring to FIG. 8, the position of the first type of input signal in the input area 1 is determined, and when the operating entity moves spatially relative to the input area 1, the position range of the first input area 11 is adjusted accordingly. When using an operating entity such as an electromagnetic pen to perform operations such as painting, the operating entity will move spatially on the input area 1, and the position range of the first input area 11 may be adjusted accordingly, so that the operating entity may always operate within the range of the first input area 11. Since the first input area 11 only receives the first type of input signal, the electronic device may respond quickly and operate synchronously. In one embodiment, the spatial position of the operating entity may be reacquired at a preset time interval to dynamically adjust the position of the first input area 11. The preset time interval may be 500 ms, 1s, etc. For example, the spatial position of the operating entity is reacquired every 500 ms, and the position of the first type of input signal in the input area 1 is determined based on the reacquired spatial position of the operating entity. When the operation entity moves spatially relative to the input area 1, the position range of the first input area 11 is adjusted accordingly.

Figure 9:
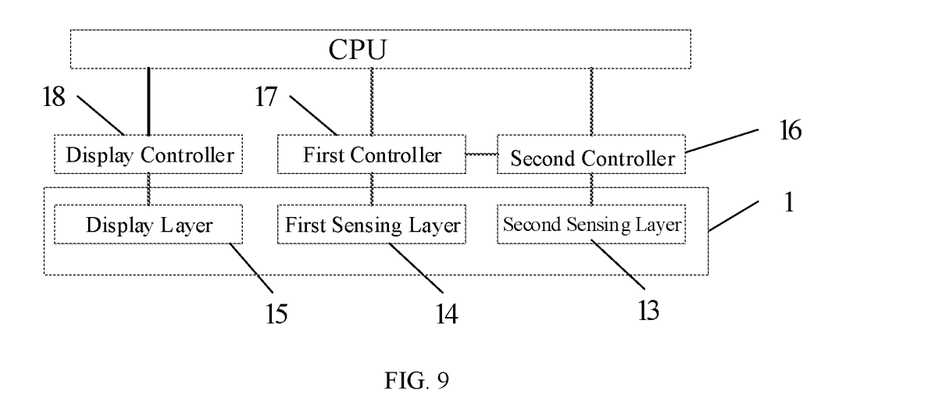
FIG. 9 shows another schematic structural diagram of an electronic device, according to an embodiment of the present disclosure.

Referring to FIGS. 8 and 9, embodiments of the present disclosure provide an electronic device, including an input area 1 and a controller. The input area 1 is used to receive a first type of input signal and a second type of input signal. The controller is used to determine the first input area 11 and the second input area 12 based on the input area 1 when the input area 1 receives the first type of input signal. The first input area 11 is used to receive the first type of input signal, and the second input area 12 is used to receive the second type of input signal. The first type of input signal is different from the second type of input signal.

The input area 1 of an electronic device according to the embodiments of the present disclosure may receive the first type of input signal and the second type of input signal. When the input area 1 receives the first type of input signal, the controller determines the first input area 11 and second input area 12 based on the input area 1. The first input area 11 is used to receive a first type of input signal, and the second input area 12 is used to receive a second type of input signal, thereby enabling the electronic device to receive input signals from the input area 1 and respond quickly to input signals. This realizes synchronous operation of input signals, thereby improving user experience.

The electronic device implemented in the present disclosure includes a first body and a second body, and the input area 1 is disposed on the first body. In one embodiment, the electronic device may be a laptop computer, the first body is the control terminal of the laptop computer, the second body is the display terminal of the laptop computer, and the input area 1 is disposed on the control terminal. The electronic device may also include a keyboard. Taking a laptop as an example, the keyboard is located on the control terminal. The keyboard may be disposed on a side close to the connection between the control terminal and the display, and the input area 1 may be disposed on a side far away from the connection between the control terminal and the display.

Figure 10:
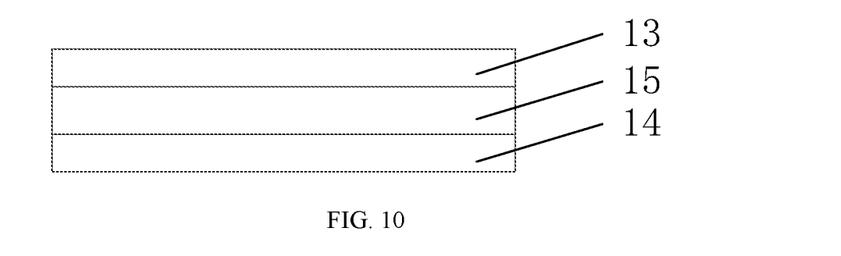
FIG. 10 shows another schematic structural diagram of an electronic device, according to an embodiment of the present disclosure.

In one embodiment, referring to FIG. 10, the input area 1 includes a first sensing layer 14 and a second sensing layer 13 arranged overlappingly. The first sensing layer 14 is used to receive the first type of input signal, and the second sensing layer 13 is used to receive the second type of input signal.

If the first sensing layer 14 receives the first type of input signal, the controller determines the second effective sensing area and the first effective sensing area. The second effective sensing area is an area where the second sensing layer 13 may receive the second type of input signal. The first effective sensing area is an area where the first sensing layer 14 may receive the first type of input signal. The first effective sensing area and the second effective sensing area correspond to the first input area 11 and the second input area 12 respectively.

In the embodiments of the present disclosure, the first input area 11 and the second input area 12 may not overlap each other, or may partially overlap. For example, the second input area 12 is a partial area of the input area 1, and the first input area 11 is at least a partial area of the input area 1. It may be that the entire input area 1 may receive the first type of input signal. Operating in an area that cannot receive the second type input signal allows rapid response to the first type of input signal.

When the first input area 11 and the second input area 12 do not overlap, the second effective sensing area corresponds to the second input area 12. When the operating entity corresponding to the second sensing layer 13 operates in the second input area 12, the area of the second sensing layer 13 corresponding to the second input area 12 is the second effective sensing area and may receive the second type of input signal. The area of the first sensing layer 14 corresponding to the second input area 12 may be an invalid sensing area and cannot receive the first type of input signal. Similarly, when the operating entity corresponding to the first sensing layer 14 is used to operate in the first input area 11, the area of the first sensing layer 14 corresponding to the first input area 11 is the first effective sensing area, which may receive the first type of input signal. The area of the second sensing layer 13 corresponding to the first input area 11 is an invalid sensing area and cannot receive the second type of input signal. The input area 1 only has the first type of input signal.

In one embodiment, the first sensing layer 14 may be an electromagnetic sensing layer, the first type of input signal is an electromagnetic signal, and the operating entity corresponding to the electromagnetic sensing layer is an electromagnetic pen. The first sensing layer 14 has an electromagnetic sensor. The electromagnetic sensor receives the signal sent by the electromagnetic pen, and the magnetic flux changes, so that the operating position may be determined. The second sensing layer 13 may be a resistive sensing layer, a capacitive sensing layer, a wave sensing layer, or the like. Correspondingly, the second type of input signal may specifically include a resistive touch signal, a capacitive touch signal, or a wave touch signal. The wave touch signal includes an acoustic wave touch signal and an infrared touch signal. The operating entity corresponding to the second sensing layer 13 may be a finger or an ordinary stylus.

In one embodiment, in the initial state, the entire input area 1 may be capable of receiving the first type of input signal and the second type of input signal. Input area 1 may be used as a mouse pad. If the first type of input signal is received, the controller determines the first input area 11 and the second input area 12 based on the input area 1. When the electromagnetic pen performs operations such as drawing in the first input area 11, the electromagnetic sensing layer corresponding to the first input area 11 may receive the signal of the electromagnetic pen, while the second sensing layer 13, such as the resistive sensing layer and the capacitive sensing layer, corresponding to the first input area 11 is an invalid sensing area and does not respond to the operation of the electromagnetic pen. A second type of input signal will not be generated. The electronic device is able to quickly respond to the first type of input signal.

In one embodiment, referring to FIG. 9, the controller includes a first controller 17 and a second controller 16. The first controller 17 is connected to the first sensing layer 14 and is used to determine the first effective sensing area. The second controller 16 is connected to the second sensing layer 13 and is used to determine the second effective sensing area. The first controller 17 is connected to the second controller 16 to notify the second controller 16 when the first sensing layer 14 receives the first type of input signal, so that the second controller 16 adjusts the second effective sensing area. The first controller 17 and the second controller 16 may be connected through a general-purpose input/output (GPIO) interface or an inter-integrated circuit (I2C) interface.

If the first sensing layer 14 receives the first type of input signal, the first controller 17 determines the first effective sensing area, the first controller 17 notifies the second controller 16, and the second controller 16 determines the second effective sensing area.

In one embodiment, based on the input of the first type of input signal, the controller may adjust the second effective sensing area to a preset size and a preset position. The first sensing layer 14 receives the first type of input signal, and the controller determines the second effective sensing area, which may be adjusting the second effective sensing area to a preset position and a preset size. The preset position may be, for example, the left side, and the preset size may be, for example, one quarter, one third, etc. of the second sensing layer 13.

In one embodiment, when the second sensing layer 13 receives the adjustment signal, the controller adjusts the area size and/or area position of the second effective sensing area. By performing an adjustment operation in the second input area 12, the area size and area position of the second effective sensing area may be adjusted. In an exemplary embodiment, in response to the second type of input signal, the second controller 16 may adjust the second effective sensing area to a corresponding position, for example, adjust the second effective sensing area from the left to the right. The second controller 16 may also adjust the size of the second effective sensing area.

In one embodiment, referring to FIGS. 9 and 10, the input area 1 also includes a display layer 15. The display layer 15 overlaps with the first sensing layer 14 and the second sensing layer 13. The display layer 15 enables the input area 1 to have a display function.

In one embodiment, the display layer 15 is configured to provide different display effects for the first input area 11 and the second input area 12.

The display layer 15 may also be configured to display information of the first type of input signal. For example, when drawing with an electromagnetic pen, the display layer 15 may display the content of the drawing in the first input area 11.

In one embodiment, referring to FIG. 10, the first sensing layer 14 is disposed below the display layer 15, and the second sensing layer 13 is disposed above the display layer 15.

Referring to FIG. 9, the display layer 15 is connected to a display controller 18. The display controller 18, the first controller 17, and the second controller 16 are respectively connected to the central processing unit (CPU) of the electronic device.

In one embodiment, when the input area 1 receives a first type of input signal, determining the first input area 11 and the second input area 12 based on the input area 1 includes: determining the position of the first type of input signal; determining the area outside the first input area 11 as the second input area 12 based on the input area 1, and determining the first input area 11 by using the position of the first type of input signal as the base point.

In one exemplary embodiment, the first controller 17 determines the position of the first type of input signal, and determines the first effective sensing area based on the position of the first type of input signal. The first effective sensing area in the first input area 11 corresponds to the input area 1. The second controller 16 determines that the second effective sensing area is an area corresponding to the area outside the first input area 11 of the input area 1.

In one embodiment, in response to the position change of the first type of input signal, the controller determines that the position of the first input area 11 changes accordingly.

In one embodiment, the controller determines the position of the first type of input signal, including: detecting that the relative positional relationship between the operating entity and the input area 1 satisfies a hovering condition, obtaining the spatial position of the operating entity, and based on the spatial position of the operating entity, determining the position of the first type of input signal in input area 1.

In one embodiment, the operating entity moves spatially relative to the input area 1, the controller reacquires the spatial position of the operating entity, and determines the position of the first type of input signal in the input area 1 based on the reacquired spatial position of the operating entity. When the operating entity moves spatially relative to the input area 1, the position range of the first input area 11 is adjusted accordingly.

In one embodiment, the position range of the first input area 11 is determined directly based on the redetermined position of the first type input signal in the input area 1, without determining whether the spatial position of the operating entity changes.

In the embodiments of the present disclosure, when the operating entity satisfies a hovering condition again, the spatial position of the operating entity may be reacquired to dynamically adjust the position of the first input area 11. It is also possible to reacquire the spatial position of the operating entity according to a preset time interval to dynamically adjust the position of the first input area 11.

In one embodiment, the position of the first type of input signal in the input area 1 is determined, and when the operating entity moves spatially relative to the input area 1, the position range of the first input area 11 is adjusted accordingly.

The electronic device in the embodiments of the present disclosure may implement the methods of the above described embodiments. The above description of the electronic device embodiments is similar to the description of the foregoing method embodiments, and has similar beneficial effects as the foregoing method embodiments, and therefore will not be described again. For technical details that have not been disclosed in the description of the embodiments of the electronic device of the present disclosure, refer to the description of the foregoing method embodiments of the present disclosure. To save space, these descriptions will not be provided again.

According to embodiments of the present disclosure, an electronic device and a readable storage medium are also provided.

Figure 11:
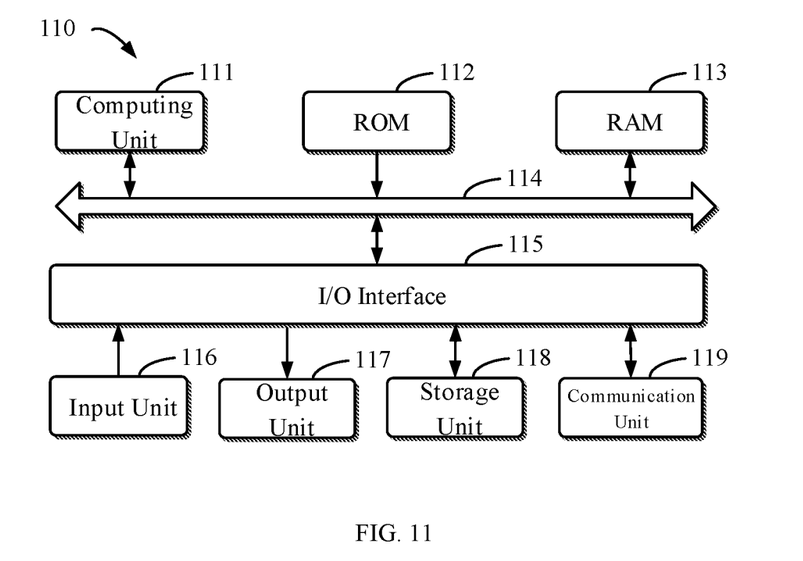
FIG. 11 shows a schematic structural diagram of an architecture of an electronic device, according to an embodiment of the present disclosure.

FIG. 11 shows a schematic block diagram of an example electronic device 110 that may be used to implement embodiments of the present disclosure. Electronic devices are intended to refer to various forms of digital computers, such as laptop computers, desktop computers, workstations, personal digital assistants, servers, blade servers, mainframe computers, and other suitable computers. Electronic devices may also include various forms of mobile devices, such as personal digital assistants, cellular phones, smart phones, wearable devices, and other similar computing devices. The components shown herein, their connections and relationships, and their functions are for exemplary purposes only and are not intended to limit embodiments of the disclosure described and/or claimed herein.

As shown in FIG. 11, the device 110 includes a computing unit 111 that may execute various appropriate actions and processes according to a computer program stored in a read-only memory (ROM) 112 or loaded from a storage unit 118 into a random access memory (RAM) 113. In the RAM 113, various programs and data required for the operation of the device 110 may also be stored. Computing unit 111, ROM 112, and RAM 113 are connected to each other via bus 114. An input/output (I/O) interface 115 is also connected to bus 114.

Multiple components in the device 110 are connected to the I/O interface 115, including: input unit 116, such as a keyboard, mouse, etc.; output unit 117, such as various types of displays, speakers, etc.; storage unit 118, such as a magnetic disk, optical disk, etc.; and communication unit 119, such as a network card, modem, wireless communication transceiver, etc. The communication unit 119 allows the device 110 to exchange information/data with other devices through computer networks such as the Internet and/or various telecommunications networks.

Computing unit 111 may be a variety of general and/or special purpose processing components having processing and computing capabilities. Some examples of the computing unit 111 include, but are not limited to, a central processing unit (CPU), a graphics processing unit (GPU), various dedicated artificial intelligence (AI) computing chips, various computing units running machine learning model algorithms, digital signal processing processor (DSP), and any appropriate processor, controller, microcontroller, etc. The computing unit 111 performs various methods and processes described above, such as the electronic device input methods. For example, in some embodiments, the electronic device input method may be implemented as a computer software program that is tangibly embodied in a machine-readable medium, such as storage unit 118. In some embodiments, part or all of the computer program may be loaded and/or installed onto device 110 via ROM 112 and/or communication unit 119. When the computer program is loaded into the RAM 113 and executed by the computing unit 111, one or more steps of the electronic device input methods described above may be performed. Alternatively, in other embodiments, the computing unit 111 may be configured to perform the electronic device input methods in any other suitable manner (e.g., by means of firmware).

Various embodiments of the systems and techniques described above may be implemented in a digital electronic circuit system, integrated circuit system, field programmable gate array (FPGA), application specific integrated circuit (ASIC), application specific standard product (ASSP), system on a chip (SOC), complex programmable logic device (CPLD), computer hardware, firmware, software, and/or combinations thereof. These various embodiments may include implementation in one or more computer programs executable and/or interpreted on a programmable system including at least one programmable processor. The programmable processor may be a special purpose or general purpose programmable processor, may receive data and instructions from a storage system, at least one input device, and at least one output device, and transmit data and instructions to the storage system, the at least one input device, and the at least one output device.

Program code for implementing the methods of the present disclosure may be written in any combination of one or more programming languages. These program codes may be provided to a processor or controller of a general-purpose computer, special-purpose computer, or other programmable data processing device, such that the program codes, when executed by the processor or controller, cause the functions specified in the flowcharts and/or block diagrams/operations to be implemented. The program codes may be executed entirely on the machine, partly on the machine, as a stand-alone software package, partly on the machine and partly on a remote machine or entirely on the remote machine or server.

In the context of this disclosure, a machine-readable medium may be a tangible medium that may contain or store a program for use by or in connection with an instruction execution system, apparatus, or device. The machine-readable medium may be a machine-readable signal medium or a machine-readable storage medium. Machine-readable media may include, but are not limited to, electronic, magnetic, optical, electromagnetic, infrared, or semiconductor systems, devices or devices, or any suitable combination thereof. More specific examples of machine-readable storage media may include one or more wire-based electrical connections, laptop disk, hard drive, RAM, ROM, erasable programmable read only memory (EPROM or flash memory), optical fiber, portable compact disk read-only memory (CD-ROM), optical storage device, magnetic storage device, or any suitable combination thereof.

To provide interaction with a user, the systems and techniques described herein may be implemented on a computer having: a display device (e.g., a cathode ray tube (CRT) or liquid crystal display (LCD) monitor) for displaying information to the user); and a keyboard and pointing device (e.g., a mouse or a trackball) through which a user may provide input to the computer. Other kinds of devices may also be used to provide interaction with the user. For example, the feedback provided to a user may be any form of sensory feedback (e.g., visual feedback, auditory feedback, or tactile feedback), and may receive from the user input provided in any form, including acoustic input, speech input, or tactile input.

The systems and techniques described herein may be implemented in a computing system that includes back-end components (e.g., as a data server), or a computing system that includes middleware components (e.g., an application server), or a computing system that includes front-end components (e.g., a user's computer having a graphical user interface or web browser through which the user may interact with embodiments of the systems and technologies described herein), or including such backend components, middleware components, or any combination of front-end components in a computing system. The components of the system may be interconnected by any form or medium of digital data communication (e.g., a communications network). Examples of communication networks include local area network (LAN), wide area network (WAN), and the Internet.

Computer systems may include client terminals and servers. Client terminals and servers are generally remote from each other and typically interact over a communications network. The relationship of client terminal and server is created by computer programs running on corresponding computers and having a client-server relationship with each other. The server may be a cloud server, a distributed system server, or a server combined with a blockchain.

It should be understood that various forms of the processes shown above may be used, with steps reordered, added or deleted. For example, each step described in the present disclosure may be executed in parallel, sequentially, or in a different order, which is not limited herein, as long as the desired results of the technical solution disclosed in the present disclosure may be achieved.

In addition, the terms "first" and "second" are used for descriptive purposes only and should not be understood as indicating or implying relative importance or implicitly indicating the quantity of indicated technical features. Thus, features defined as "first" and "second" may explicitly or implicitly include at least one of these features. In the description of the present disclosure, "plurality" means two or more than two, unless otherwise expressly and specifically limited.

The foregoing descriptions are merely some specific embodiments of the present disclosure, but the protection scope of the present disclosure is not limited thereto. Any person familiar with the technical field may easily derive changes or substitutions within the technical scope disclosed in the present disclosure, which should be covered by the protection scope of the disclosure. Therefore, the protection scope of the present disclosure should be subject to the protection scope of the claims.

What is claimed is:

1. An electronic device input method, comprising:
receiving a first type of input signal at an input area of an electronic device having a display screen; and
dividing the input area into a first input area and a second input area in response to only receiving the first type of input signal, wherein the first input area is used to receive the first type of input signal and the second input area is used to receive a second type of input signal, the first type of input signal is an electromagnetic signal generated by an electromagnetic pen, and the second type of input signal is a non-electromagnetic touch signal generated by a finger or a common stylus pen touching the input area;
displaying drawing content simultaneously in the first input area and in the display screen of the electronic device, wherein display content of the first input area and display content of the display screen change synchronously with the drawing content; and
controlling the display content in the first input area and the display content displayed in the display screen of the electronic device synchronously according to an input of the second type of input signal in the second input area.

2. The method according to claim 1, wherein an area size of the second input area is capable of being adjusted based on an input of the second type of input signal, and/or an area size of the first input area is adjustable based on an input of the first type of input signal.

3. The method according to claim 1, further comprising:
displaying shortcut keys in the second input area, the shortcut keys being used to control the electronic device; and
wherein the display screen is separated from the input area.

4. The method according to claim 1, wherein dividing the input area into the first input area and the second input area comprises:
determining a size of the second input area according to the first type of input signal, and determining a size of the first input area according to the input area,
wherein:
the first input area and the second input area have different display effects;
the size of the second input area is adjusted by a two-finger operation; and
a position of the second input area is adjusted through a drag operation.

5. The method according to claim 1, wherein dividing the input area into the first input area and the second input area comprises:
determining a position of the first type of input signal; and
based on the input area, determining an area other than the first input area as the second input area, wherein the first input area is determined based on a position of the first type of input signal.

6. The method according to claim 5, wherein determining the position of the first type of input signal comprises:

obtaining a spatial position of an operating entity upon detecting that a relative positional relationship between the operating entity and the input area satisfies a hovering condition; and
determining the position of the first type input signal in the input area based on the spatial position of the operating entity.

7. The method according to claim 6, wherein the operating entity moves spatially relative to the input area, and when the hovering condition is met again, the spatial position of the operating entity is reacquired, the position of the first type of input signal in the input area is determined based on the reacquired spatial position of the operating; or
when the operating entity moves spatially relative to the input area, a position range of the first input area is adjusted accordingly.

8. An electronic device input system, comprising:
a processor; and
a memory coupled to the processor, the memory storing instructions that, when executed by the processor, cause the processor to:
receive a first type of input signal at an input area of an electronic device having a display screen; and
divide the input area into a first input area and a second input area in response to only receiving the first type of input signal, wherein the first input area is used to receive the first type of input signal and the second input area is used to receive a second type of input signal,
the first type of input signal is an electromagnetic signal generated by an electromagnetic pen, and
the second type of input signal is a non-electromagnetic touch signal generated by a finger or a common stylus pen touching the input area;
displaying drawing content simultaneously in the first input area and in the display screen of the electronic device, wherein display content of the first input area and display content of the display screen change synchronously with the drawing content; and
controlling the display content in the first input area and the display content displayed in the display screen of the electronic device synchronously according to an input of the second type of input signal in the second input area.

9. The system according to claim 8, wherein an area size of the second input area is capable of being adjusted based on an input of the second type of input signal, and/or an area size of the first input area is adjustable based on an input of the first type of input signal.

10. The system according to claim 8, wherein the instructions, when executed by the processor, further cause the processor to:
display shortcut keys in the second input area, the shortcut keys being used to control the electronic device,
wherein the display screen is separated from the input area.

11. The system according to claim 8, wherein, to divide the input area into the first input area and the second input area, the instructions, when executed by the processor, further cause the processor to:
determine a size of the second input area according to the first type of input signal, and determine a size of the first input area according to the input area,
wherein:
the first input area and the second input area have different display effects;

the size of the second input area is adjusted by a two-finger operation; and a position of the second input area is adjusted through a drag operation.

12. The system according to claim 8, wherein, to divide the input area into the first input area and the second input area, the instructions, when executed by the processor, further cause the processor to:

determine a position of the first type of input signal; and based on the input area, determine an area other than the first input area as the second input area, wherein the first input area is determined based on a position of the first type of input signal.

13. The system according to claim 12, wherein, to determine the position of the first type of input signal, the instructions, when executed by the processor, further cause the processor to:

obtain a spatial position of an operating entity upon detecting that a relative positional relationship between the operating entity and the input area satisfies a hovering condition; and determine the position of the first type input signal in the input area based on the spatial position of the operating entity.

14. The system according to claim 13, wherein the operating entity moves spatially relative to the input area, and when the hovering condition is met again, the spatial position of the operating entity is reacquired, the position of the first type of input signal in the input area is determined based on the reacquired spatial position of the operating; or when the operating entity moves spatially relative to the input area, a position range of the first input area is adjusted accordingly.

15. An electronic device, comprising:

a display screen;

an input area, including a first sensing layer and a second sensing layer arranged overlappingly, wherein the first sensing layer is used to receive a first type of input signal and the second sensing layer is used to receive a second type of input signal; and a controller configured to divide the input area into a first input area and a second input area in response to the first sensing layer only receiving the first type of input signal, wherein the second effective sensing area is an area that the second sensing layer is able to receive the second type of input signal, the first effective sensing area is an area where the first sensing layer is able to receive the first type of input signal, and the first effective sensing area and the second effective sensing area respectively correspond to the first input area and the second input area included in the input area;

wherein:

the first type of input signal is an electromagnetic signal generated by an electromagnetic pen;

the second type of input signal is a non-electromagnetic touch signal generated by a finger or a common stylus pen touching the input area; and the controller is further configured to:

display drawing content simultaneously in the first input area and in the display screen of the electronic device, wherein display content of the first input area and display content of the display screen change synchronously with the drawing content; and control the display content in the first input area and the display content displayed in the display screen of the electronic device synchronously according to an input of the second type of input signal in the second input area.

16. The electronic device according to claim 15, wherein the controller adjusts the second effective sensing area to a preset size and a preset position based on an input of the first type of input signal.

17. The electronic device according to claim 15, wherein the controller adjusts an area size and/or area position of the second effective sensing area when the second sensing layer receives an adjustment signal.

18. The electronic device according to claim 15, wherein the controller includes a first controller and a second controller, the first controller is connected to the first sensing layer and is used to determine the first effective sensing area, the second controller is connected to the second sensing layer and is used to determine the second effective sensing area.

19. The electronic device according to claim 18, wherein the first controller is connected to the second controller to notify the second controller when the first sensing layer receives the first type of input signal, so that the second controller adjusts the second effective sensing area.

20. The electronic device according to claim 19, wherein, if the first sensing layer receives the first type of input signal, the first controller determines the first effective sensing area, the first controller notifies the second controller, and the second controller determines the second effective sensing area.

* * * * *